(12) United States Patent
Mueller et al.

(10) Patent No.: US 8,563,449 B2
(45) Date of Patent: *Oct. 22, 2013

(54) NON-WOVEN MATERIAL AND METHOD OF MAKING SUCH MATERIAL

(75) Inventors: Donald Mueller, Ivanhoe, IL (US); Weixin Song, Lake Forest, IL (US); Bangji Cao, Naperville, IL (US)

(73) Assignee: USG Interiors, LLC, Chicago, IL (US)

( * ) Notice: Subject to any disclaimer, the term of this patent is extended or adjusted under 35 U.S.C. 154(b) by 628 days.

This patent is subject to a terminal disclaimer.

(21) Appl. No.: 12/061,825

(22) Filed: Apr. 3, 2008

(65) Prior Publication Data

US 2009/0253323 A1    Oct. 8, 2009

(51) Int. Cl.
*D04H 1/10* (2006.01)
*D04H 1/12* (2006.01)
*D04H 1/14* (2006.01)
*D04H 1/54* (2012.01)
*D02G 3/04* (2006.01)

(52) U.S. Cl.
USPC ........... 442/365; 442/361; 442/362; 442/364; 442/417; 428/373; 428/374

(58) Field of Classification Search
USPC ........ 442/361–365, 417; 428/34.5–34.7, 372, 428/373, 374
See application file for complete search history.

(56) References Cited

U.S. PATENT DOCUMENTS

| | | |
|---|---|---|
| 4,006,037 A | 2/1977 | Tirpak et al. |
| 4,124,730 A * | 11/1978 | Albert et al. ................. 427/220 |
| 4,795,668 A | 1/1989 | Krueger et al. |
| 4,889,764 A | 12/1989 | Chenoweth et al. |
| 4,990,550 A | 2/1991 | Iwanami et al. |
| 5,106,564 A | 4/1992 | Iwanami et al. |
| 5,108,827 A | 4/1992 | Gessner |
| 5,880,239 A | 3/1999 | Tschirner et al. |
| 5,911,818 A | 6/1999 | Baig |
| 5,948,528 A | 9/1999 | Helms, Jr. et al. |

(Continued)

FOREIGN PATENT DOCUMENTS

| | | |
|---|---|---|
| EP | 0833973 A1 | 4/1998 |
| JP | 6-257048 A | 9/1994 |

(Continued)

OTHER PUBLICATIONS

Tsou, Andy article titled "Fillers" published online Mar. 15, 2004 in the Encyclopedia of Polymer Science and Technology.*

(Continued)

*Primary Examiner* — Jennifer A Steele
(74) *Attorney, Agent, or Firm* — Pearne & Gordon LLP

(57) ABSTRACT

A non-woven material and method of formation thereof is provided to form a substantially flat or planar self supporting core of an inorganic base fiber and an organic binding fiber preferably using an air-laid forming head. In certain preferred embodiments, the organic base fiber has a fiber strength with a break load of about 10 grams or less and an elongation of about 20 percent or less. Preferably, the organic binding fiber has a binding component and a structural component within unitary fiber filaments. In one aspect, the structural component of the organic binding fiber has a composition effective to provide a strength thereof so that the non-woven material can be manually cut with minimal effort. In such form, the non-woven material is suitable to function as an acoustic ceiling tile.

8 Claims, 2 Drawing Sheets

(56) References Cited

U.S. PATENT DOCUMENTS

| | | | |
|---|---|---|---|
| 5,968,645 A | 10/1999 | Caccini et al. | |
| 6,008,150 A | 12/1999 | Thyssen et al. | |
| 6,039,903 A | 3/2000 | Kent et al. | |
| 6,149,971 A | 11/2000 | Lusardi | |
| 6,412,154 B1 | 7/2002 | Plotz | |
| 6,539,955 B1 | 4/2003 | Tilton et al. | |
| 6,596,389 B1 | 7/2003 | Hallett et al. | |
| 6,630,046 B1 | 10/2003 | Plotz | |
| 6,797,377 B1* | 9/2004 | DeLucia et al. | 428/372 |
| 6,915,052 B2 | 7/2005 | Boogh | |
| 7,000,729 B2 | 2/2006 | Jacobsen | |
| 7,015,261 B1 | 3/2006 | Zerafati et al. | |
| 7,138,023 B2 | 11/2006 | Haque et al. | |
| 7,199,065 B1 | 4/2007 | Groh et al. | |
| 7,226,879 B2 | 6/2007 | Tilton et al. | |
| 7,294,218 B2 | 11/2007 | Haque et al. | |
| 7,351,673 B1 | 4/2008 | Groh et al. | |
| 7,537,818 B2 | 5/2009 | Allison et al. | |
| 2002/0160682 A1* | 10/2002 | Zeng et al. | 442/411 |
| 2003/0035951 A1 | 2/2003 | Magill et al. | |
| 2003/0060113 A1* | 3/2003 | Christie et al. | 442/364 |
| 2003/0091803 A1 | 5/2003 | Bond et al. | |
| 2003/0134556 A1 | 7/2003 | Christie et al. | |
| 2004/0013884 A1 | 1/2004 | Plotz | |
| 2004/0065507 A1 | 4/2004 | Jacobsen | |
| 2004/0161993 A1* | 8/2004 | Tripp et al. | 442/341 |
| 2004/0185225 A1 | 9/2004 | Fay et al. | |
| 2004/0242107 A1 | 12/2004 | Collins | |
| 2005/0031277 A1 | 2/2005 | Japon | |
| 2005/0115662 A1 | 6/2005 | Haque et al. | |
| 2005/0148259 A1 | 7/2005 | Tilton et al. | |
| 2005/0266757 A1 | 12/2005 | Roekens et al. | |
| 2006/0137799 A1 | 6/2006 | Haque et al. | |
| 2006/0230589 A1 | 10/2006 | Christensen | |
| 2006/0292952 A1 | 12/2006 | Xing et al. | |
| 2007/0009722 A1 | 1/2007 | Strait | |
| 2007/0293632 A1 | 12/2007 | Riegel et al. | |
| 2008/0014815 A1 | 1/2008 | Geel et al. | |
| 2008/0251187 A1 | 10/2008 | Haque et al. | |
| 2011/0121482 A1 | 5/2011 | Roekens et al. | |

FOREIGN PATENT DOCUMENTS

| | | |
|---|---|---|
| JP | 9-11374 A | 1/1997 |
| JP | 2003-301357 A | 10/2003 |
| WO | WO 2006/107847 A2 | 10/2006 |
| WO | 2009146056 A2 | 12/2009 |

OTHER PUBLICATIONS

Written Opinion of the International Searching Authority dated Jul. 30, 2009, International Search Report dated Jul. 30, 2009 of International Application No. PCT/US2009/039073, Filed Apr. 1, 2009.

Supplementary European Search Report dated Jun. 8, 2011 of corresponding Application No. EP 09 72 8232.

* cited by examiner

NON-WOVEN MATERIAL AND METHOD OF MAKING SUCH MATERIAL

FIELD

The field relates to a non-woven material as well as a method of its manufacture, and more particularly, a non-woven material effective to provide sound absorption suitable for use as an acoustic ceiling tile.

BACKGROUND

A typical acoustic ceiling tile is a non-woven structure including a core manufactured from base fibers, fillers, and binders. The base fibers are usually mineral wool or glass fibers. The fillers are commonly perlite, clay, calcium carbonate, or cellulose fibers. The binder is typically cellulose fibers, starch, latex, or similar materials. Upon drying, the binder forms bonds with the other materials to form a fibrous network that provides structural rigidity to the core. To be used as a typical ceiling tile, the core should be substantially flat and self-supporting in order to be suspended in a typical ceiling tile grid or similar structure.

For non-woven structures to be suitable for acoustical ceiling tile applications, they generally satisfy various industry standards and building codes relating to fire rating and noise reduction. For example, industry standards typically specify ceiling tiles to have a Class A fire rating according to ASTM E84, which generally requires a flame spread index less than 25 and a smoke development index less than 50. Regarding noise reduction, industry standards typically specify the acoustical ceiling tile to have a noise reduction coefficient according to ASTM C423 of at least about 0.55.

Acoustic ceiling tiles are commonly formed via a wet-laid process that uses an aqueous medium to transport and form the tile components into a non-woven mat used to form the core of the acoustic ceiling tile. The basic process involves first blending the various tile ingredients into an aqueous slurry. The aqueous slurry is then transported to a headbox and distributed over a moving, porous wire web to form a uniform mat having a desired size and thickness. Water is then removed and the mat is dried. The dried mat may then be finished into the ceiling tile structure by slitting, punching, coating and/or laminating a surface finish to the tile. In the wet-laid process, water serves as the transport media for the various tile ingredients. This wet laid process is acceptable because high production speeds can be attained and because low cost raw materials (for example, recycled newsprint fibers, recycled corrugated paper, scrap polyester fibers, cotton linters, waste fabrics, and the like) can be used. However, using water to manufacture acoustical ceiling tile presents a number of shortcomings that render the process and formed product less than desirable.

The wet-laid process uses a great deal of water to transport and form the components into the ceiling tile structure. The large amounts of water must eventually be removed from the product. Most wet processes, therefore, accommodate water removal by one or more steps of free draining, vacuum, compression, and/or evaporation. These process steps entail large energy demands to transport and remove the water. As such, the handling of large volumes of water to form the tile along with the subsequent removal and evaporation of the water renders the typical wet-laid process relatively expensive due to high equipment and operating costs.

It also is difficult using a wet-laid process to form an acoustical ceiling tile having high sound absorption properties. In a wet-laid process, the formed ceiling tiles tend to have a sealed surface due to the nature of the ingredients in the wet-laid formulation. A ceiling tile with a sealed surface generally has a less efficient acoustical barrier because the tile is less porous, which renders the tile less capable of absorbing sound. The sealed tile surface may actually reflect sounds, which is an undesired characteristic in an acoustical ceiling tile.

These undesired acoustical characteristics are believed to occur from the hydrophilic nature of the tile ingredients typically used in the wet-laid process. Cellulose fibers (for example, recycled newsprint), which are commonly used as low cost binder and filler in a ceiling tile, are highly hydrophilic and attract an extensive amount of water. Due in part to such hydrophilic components, wet-laid tiles typically have a high tipple moisture content (i.e., the moisture level of the board immediately prior to entering the drying oven or kiln) of about 65 to about 75 percent, which increases the demands of evaporation during drying. As a result, a high surface tension is generated on the tile ingredients during drying as water is removed from these hydrophilic components. Water, a polar molecule, imparts surface tension to the other components. This surface tension generally causes the tile surface to be sealed with a less porous structure. It is believed that the surface tension draws elements in the tile closer together densifying the structure and closing the tile pores in the process. Consequently, wet-laid produced ceiling tiles require further processing to perforate the tile in order to achieve acceptable noise reduction. Therefore, while a wet-laid process may be acceptable due to increased production speeds and the ability to use low cost materials, the use of water as a transport media renders the process and resulting product less cost effective when acoustic characteristics are required for the product.

In some cases, a latex binder also may be used in acoustical ceiling tiles and is often preferred in a wet-laid process using mineral wool as the base fiber. Latex, however, is generally the most expensive ingredient employed in a ceiling tile formulation; therefore, it is desired to limit the use of this relatively high cost ingredient. Other binders commonly employed in ceiling tiles are starch and, as described above, cellulose fibers. Starch and cellulose, however, are hydrophilic and tend to attract water during processing and generate the high surface tension problems described above.

Other non-woven structures, such as diapers, hygienic wipes, filtration media, and automotive insulation, may be formed via an air-laid process that uses air as the transport media for the various ingredients forming a non-woven material. An air-laid process eliminates the need to transport and remove water; however, all components in the formulation must be transportable in an air stream. As a result, heavy, dense, or long fibers as well as liquid components are generally not suitable for the air-laid process. That is, liquid resin binders and/or latex binders commonly used in ceiling tile manufacture generally cannot be used in the air laid process. Typical air-laid processes, therefore, prefer short glass fibers employed as the base fiber (i.e., about 10 mm in length) together with some type of heat-fusible or thermal bonding fiber, such as a single component or a bi-component bonding fiber. Once formed into a non-woven material, the thermal bonding fiber is heated to melt a portion of the fiber in order to bond the base fiber structure within the desired core structure.

WO 2006/107847 A2 discloses an air-laid process to form automobile insulation and ceiling tile structures using bi-component thermal bonding fibers and synthetic or cellulose matrix fibers. In one example, the '847 publication describes a ceiling tile composition of 30 percent bi-component fiber and 70 percent cellulose fiber (fluff) that provides improved acoustical properties over commercial mineral fiber and glass fiber ceiling tiles. While providing improved acoustical properties, the disclosed ceiling tile structures of the '847 publication have the shortcoming that they would generally not comply with current fire code ratings specified by industry standards for use as a ceiling tile. With the use of 70 percent cellulose fibers in the ceiling tile (as well as 100 percent organic fibers), it is expected that the formed base mats of the '847 publication would not comply with the fire code ratings of ASTM E84 requirements for ceiling tiles due to such high levels of cellulose and organic fibers.

The '847 publication above and US 2006/0137799 A1 further suggest that non-woven structures can be made using air-laid processes with glass fibers together with bi-component fibers. While the glass fiber would provide enhanced fire ratings under industry standards, glass fibers having a short size suitable for air-laid processes are a more expensive raw material and have health and environmental disadvantages relative to other raw materials. For example, glass fibers may cause irritation to human skin, eyes, and respiratory systems. Many organizations consider glass fibers as an acute physical irritant to skin, eyes, and the upper respiratory tract. Generally, the smaller the fiber sizes, the harsher the irritation. In some cases, if the exposure to glass fibers is sufficient, the fibers may produce irritation dermatitis and difficulty in breathing. In other cases, some studies have shown that fiberglass when combined with dust, dirt, and moisture can be a good medium for microbial growth of mold, fungus, and some bacteria.

As noted above, mineral wool also is commonly used in acoustical ceiling tiles to provide enhanced fire ratings because mineral wools can have melting points up to 2200° F., which is even higher than common glass fibers. Mineral wools are commonly used in the wet-laid process along with starch or latex binders to form acoustical ceiling tiles. However, due to the abrasive nature and high shot content of typical mineral wools (i.e., up to about 60 percent in some cases), this raw material is generally not recommended for use in an air-laid process because the abrasive nature of the mineral wool fiber tends to be destructive to the air-laid forming equipment and the high shot content can plug air filtering systems to decrease the efficiency of vacuum suction boxes. With decreased vacuum strengths, the air-laid forming head has difficulty forming a uniform mat having a basis weight sufficient to provide the rigidity needed for ceiling tiles. As used herein, mineral wool shot generally refers to a by-product of the mineral wool manufacturing process comprising non-fibrous, mineral particulate matter having diameters ranging from about 45 to about 500 microns.

The '847 publication lists glass fibers and ceramic fibers as suitable synthetic matrix fibers to be used in an air laid process, but specifically does not list mineral wool as an acceptable substitute. As generally understood, mineral wool fibers are considered distinct from glass fibers and ceramic fibers. Even though all such fibrous types are generally man-made or synthetic fibers, each has different characteristics and properties due to raw material sources and manufacturing methods. Glass fibers are manufactured through an extrusion process forming a continuous filament that is typically chopped into a desired size; as a result, glass fibers typically do not include an appreciable shot content. Ceramic fibers, on the other hand, are typically made from a spinning or blowing method with more expensive raw materials. Ceramic fibers typically have substantially less shot content than mineral wool fibers.

Notwithstanding the above, however, due to the strength of the high melting component in common bi-component fibers used in air-laid forming processes, existing multi-component fibers also have a relatively high strength (i.e., break load and elongation), which is a property desired in the products for which this type of fiber is commonly used (i.e., diapers, hygienic wipes, filtration media, and automobile insulation). However, consumers of acoustic ceiling tile expect the tile to be manually cuttable, such as with a common utility knife, so that an installer can easily cut holes in the ceiling tile for sprinklers, lights, HVAC ducts, and the like. In addition, it is not uncommon for a typical suspended ceiling to require partial size tiles for edges or corners. Because acoustic ceiling tiles generally come in standard, fixed sizes, the installer is often required to cut individual tiles to fit the particular requirements of the ceiling grid. Generally due to the high strength (i.e., break loads and elongation) of commercially available bi-component fibers, forming acoustic ceiling tiles using existing bi-component fibers produces a tile that requires excessive force to cut and exhibits fiber pull out, which are properties undesired by consumers and installers.

In short, existing wet-laid and air-laid processes with available ingredients commonly used therewith cannot cost effectively produce an acceptable acoustic ceiling tiles that meet all industry and building code standards (i.e., acoustic requirements) as well as consumer expectations for acoustic ceiling tiles (i.e., cutability, flatness, self supporting, and the like). Existing wet-laid processes are energy and capital intensive and form ceiling tiles with less desired acoustical properties. Air laid non-woven materials, which may be suitable for diapers, filter media, and automotive insulation, may be more economical to manufacture, but existing formulations and processes are not suitable to manufacture acoustic ceiling tiles meeting both consumer and industry specifications. Air laid non-woven materials formed with high amounts of cellulose and/or organic fibers generally will not meet industry fire rating standards for ceiling tiles, and the use of available bi-component fibers renders the formed material difficult to cut due to the high strength and elongation of these fibers. While short glass fiber can be use in ceiling tiles and an air-laid process, glass fibers can be cost prohibitive and have health and environmental concerns.

Accordingly, a flat, self-supporting non-woven material comprising bi-component fibers and method of making thereof that is suitable under industry standards as acoustic ceiling tile (i.e., acoustic properties) that can be fabricated without the energy and capital costs of a wet-laid process and that also meets consumer expectations for cutability are desirable.

DETAILED DESCRIPTION

Figure 1:
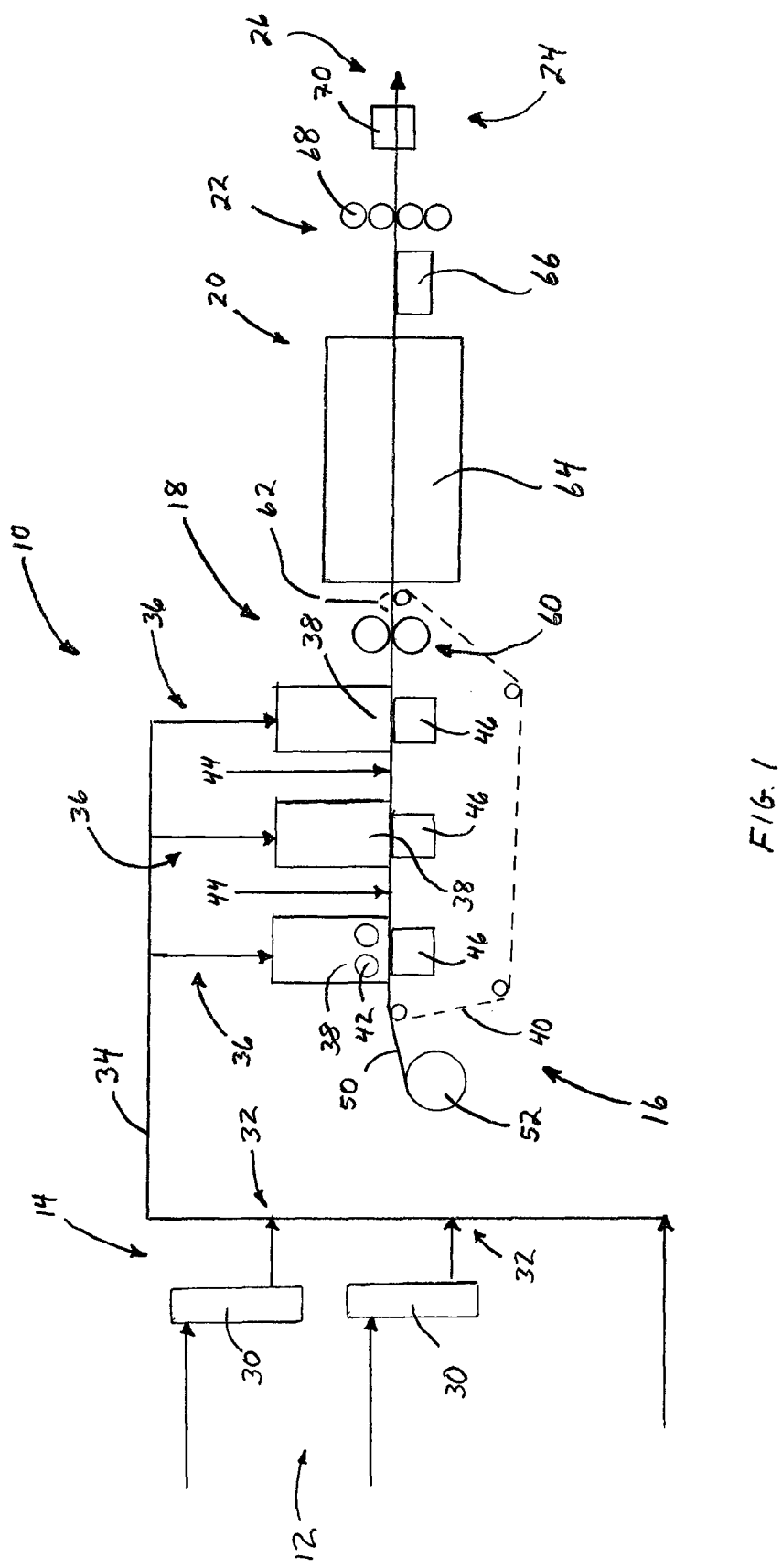
FIG. 1 is a schematic view of an exemplary air-laid process for forming the non-woven materials described herein.

In general, a non-woven material is provided including a blend of an inorganic base fiber and an organic binding fiber. By one approach, the non-woven material is capable of being formed into a core or base mat having a predetermined basis weight and density sufficient to provide a substantially planar, rigid, and self-supporting core that further provides sound absorption effective for the non-woven material to be used as an acoustic ceiling tile. That is, for example, the non-woven material is preferably capable of forming a self-supporting core that exhibits noise reduction coefficients of at least about 0.55 per ASTM C423 and a Class A fire rating with a flame spread index less than about 25 and a smoke development index less than about 50 both per ASTM E84. The characteristics of the non-woven material may vary, however, depending on the particular application. The core also preferably exhibits a high flexural strength, but can still be manually cut, such as with a common utility knife, using light or minimal pressure similar to traditional wet-laid ceiling tiles.

In one aspect, the inorganic base fiber is preferably mineral wool, slag wool, rock wool, or combinations thereof having a shot content up to about 60 percent and, preferably, between about 10 to about 45 percent. Suitable inorganic base fibers are Thermafiber FRF (Wabash, Ind.); however, other inorganic base fibers also may be used. By one approach, the non-woven material preferably includes about 30 to about 95 percent rock wool or slag wool. Preferably, the inorganic fibers have a length from about 0.1 to about 4 mm on average and a diameter of about 1 to about 15 microns.

In another aspect, the organic binding fiber is preferably a bi-component thermal bonding fiber that has two components within the same filament, i.e. a unitary filament. Preferably, the non-woven material includes about 0.1 to about 70 percent, and most preferably 5 to about 50 percent of the bi-component fibers. However, because commercially available bi-component fibers are generally known for their relatively high strength (i.e., break load and elongation), the bi-component fibers used herein are preferably modified so that the formed non-woven material also exhibits a cutability similar to traditional acoustic ceiling tiles. In other words, the non-woven material is capable of forming an acoustic tile core that exhibits high flexural strength, but can still be cut manually, such as with a common utility knife, with light pressure or only minimal effort even with the use of bi-component fibers in the core. To this end, it is preferred that the modified bi-component fibers have a predetermined strength (i.e., break load and elongation) substantially similar to the inorganic base fiber and other components of the core, which is a generally reduced strength as compared to commercially available bi-component fibers.

Bi-component fibers generally have at least two polymers or resins of different chemical and/or physical properties with both polymers formed into a unitary filament or fiber. For example, one polymer functions as a binding component and the other polymer functions as a structural component. Common bi-component fibers have a sheath-core, side-by-side, eccentric sheath-core, or island-sea configuration of the binding component and structural component. One polymer of the fibers, usually the structural component, has a higher melting point than the other polymer of the fiber. In this regard, once the formed mat is heated to the melting temperature of the lower melting polymer, it melts to bind the other tile ingredients together. The higher melting point polymer remains intact in a fibrous form to provide further strength and structure to the non-woven material. Upon cooling, a plurality of bonds are generally created along single fiber lengths in the base mat. Typical bi-component fibers commonly include polyethylene/polyethylene terephthalate ("PE/PET"), polyethylene/polyproylene ("PE/PP"), polyethylene terephthalate co-polymer/polyethylene terephthalate ("CoPET/PET"), and the like polymer combinations. Preferably, the non-woven materials herein include bi-component fibers having PE/PET or CoPET/PET polymers with a sheath/core configuration. The sheath/core is advantageous because it provides increased contact areas and strength while maintaining structural integrity of the base mat. In one embodiment, the area ratio between the sheath and core ranges from about 80/20 to about 20/80.

As mentioned above, one component (i.e., the binding component) of the bi-component fiber has a melting point lower than the other component (i.e., the structural component). By one approach, the binding component or the first polymer component has a melting point about 25° C. to about 50° C. lower than a melting point of the structural or second polymer component. In this manner, the bi-component fiber has a sufficient melting point differential between the two polymers to permit use in the non-woven material so that only one of the polymer components is melted upon heating. For example, a preferred bi-component fiber for use in the non-woven material has a sheath melting point of about 100 to about 220° C. and a core melting point of about 150 to about 270° C.

Preferably, the bi-component fibers have a linear density, known in the art as a Denier, of about 1 to about 72 grams/9, 000 meters; however, other Denier also may be suitable depending on the formulation being used, the particular application, and other factors. The bi-component fibers also preferably have a fiber length between about 1 and about 25 mm, and most preferably, between 1 and about 10 mm. While specific characteristics of the inorganic and organic fibers are discussed above, which are generally preferred to form a core suitable for acoustic ceiling tiles, other fiber properties also may be selected depending on the particular application and process.

As discussed in the background, commercially available bi-component fibers typically used in non-woven fabrics, diapers, wipes, filter media, and automotive insulation are generally too strong for use in acoustic ceiling tiles because the formed tile would require excessive force to cut. The strength of these fibers can be determined through the combination of break load and percent elongation (Din EN SSO 5079 or ASTM D3217). As shown in the table below, commercially available bi-component and monofilament fibers (as generally reported by fiber suppliers) typically exhibit unacceptable break loads ranging from about 2 to about 100 grams and elongation values ranging from about 30 to about 400 percent. These commercially available fibers do not have combined properties similar to the inorganic base fibers commonly used in ceiling tiles. While not intending to be limited by theory, it is believed that such fiber strength of these existing fibers is primarily due to the composition of the structural component in the bi-component fiber.

TABLE 1

Comparison of Existing Fiber Strength

| | | Fiber Strength | |
| --- | --- | --- | --- |
| | Fiber Type | Break Load, Grams | Elongation, % |
| Monofilament Fibers | PET, regular | 7.4 | 24 to 42 |
| | PET, high tenacity | 22 to 51 | 9 to 26 |
| | PET, undrawn | 95 | 350 to 400 |
| | LLPDE | 6 | 100 to 175 |
| | Nylon | 4.2 | 25 to 65 |
| | Acrylic | 4.2 | 25 to 40 |
| | PP | 13.5 | 30 to 180 |
| | Rayon | 1.8 | 17 to 26 |
| | Polyactic Acid | 6.5 | 35 to 65 |
| | Nomex | 9.4 | 22 to 32 |
| Bi-Component Fibers | PE/PET | 9 to 70 | 33 to 50 |
| | CoPET/PET | 11.4 | 60 |
| | Bionolle/Biomax | 4.9 | 75 |

TABLE 1-continued

Comparison of Existing Fiber Strength

| | | Fiber Strength | |
|---|---|---|---|
| | Fiber Type | Break Load, Grams | Elongation, % |
| | HDPE/PP | 2.9 | 78 |
| | EVA/PP | 2.2 | 230 |
| | EVOH/PP | 4 | 46 |
| Inorganic Fibers | Mineral Wool | 1.1 | <6 |
| | Fiber Glass | 3.5 | <6 |

These high strength levels of existing synthetic bonding fibers, however, are generally unacceptable for use in a ceiling tile structure because they result in products that require a great amount of force to cut, and there is an undue amount of fiber waste that is released during cutting. For comparison, mineral wool or fiber glass traditionally used to manufacture ceiling tiles have break loads less than 3.5 grams and elongation values less than about 6 percent. For good cutability, it is desired that the ingredients in the base mat are physically compatible with each other or generally do not differ substantially in their physical properties (such as, for example, fiber strength); otherwise, if the physical properties of the individual fibers are substantially different, one component will tend to separate from the other component when the mat is subjected to a cutting force.

Accordingly, it is preferred that the modified bi-component fibers herein exhibit physical properties or a cutability similar to that of mineral wool or glass fibers. By one approach, the modified bi-component binding fibers have a composition effective to provide a predetermined strength thereof (i.e., break load and elongation) similar to the inorganic base fibers used in the core. In one aspect, the predetermined strength of the modified bi-component fibers is a break load less than about 10 grams (preferably about 1 to about 10 grams and, most preferably, about 1 to about 4 grams) and an elongation less than 20 percent (preferably less than about 10 percent and, most preferably, less than about 6 percent). Fiber break load is generally proportional to the Denier of the fiber. Typically, the finer the fiber, the better the cutability. Preferably, the Denier of the modified organic fiber used herein is about 0.7 to about 1.7 and, preferably, about 1.1 to about 1.7.

By one approach, the predetermined and reduced strength (break load and elongation) of the modified bi-component fiber is obtained by providing a composition of the structural component effective to modify the physical properties of this component of the bi-component fiber. For example, the strength of the fiber (such as the structural component therein) may be modified by providing a blend of a thermoplastic resin and an effective amount of filler. In another approach, the strength of the structural component may be modified by providing a material, such as a resin, having a predetermined molecular weight range. In yet another approach, the relative amounts of crystalline to amorphous regions of the resin used to form the structural component can be varied in order to obtain the desired strength. Combinations of these approaches also may be employed as needed to achieve the desired shear strength level.

More specifically, fillers can be added to the polymer resin used to form the structural component of the bi-component fiber to achieve the reduced strength levels. By one approach, about 1 to about 300 parts of filler per about 100 parts of polymer resin by weight can be added to the resin (i.e., about 0.25 to about 75 weight percent filler in the polymer resin and, preferably, about 5 to about 50 percent by weight) to achieve the desired strength. In addition to reductions in strength, the filled polymers can also exhibit fiber stiffening (modulus increase) and improved surface burning characteristics as a result of reduced organic mass.

Suitable fillers include, but are not limited to, ground calcium carbonate, precipitated calcium carbonate, Kaolin, talc, silica, feldspar, nepheline, mica, wallastonite, perlite, glass, silicates, titanium dioxide, calcium sulfate, and the like as well as mixtures thereof. In addition, antimony oxide, alumina trihydrate, phosphates, and the like as well as combinations thereof may also be added to the fiber or resins to provide flame retardancy. The sizes of the fillers generally should be below about 3 microns and, preferably, about 0.1 to about 2 microns; however, the size can vary depending on the application and size of the fiber. Even though the term "filler" is used in this disclosure as a generic term for the aforementioned materials, it will be appreciated by a skilled artisan that such materials each has unique properties that can enhance the performance of acoustical ceiling tiles.

While not intended to be limited by theory, the strength (break load and elongation) of a polymer resin and filler combination (i.e., a compound) is related to the amount of filler added to the resin. In general, the more added filler, the lower the break load and elongation. See, for example, Katz et al., Handbook of Fillers and Reinforcement for Plastics, 1978, pages 81 to 118, which is incorporated herein by reference.

The amount of filler added is generally dependent on the parameters of a particular filler, which can be characterized by at least its packing characteristics, sizes, and interfacial bonding. By one approach, the maximum volumetric packing fraction of a filler ($P_f$) in a base material is a parameter based on the size distribution and the shapes of the filler particles. As the amount of filler approaches $P_f$, it is believed that the filler particles of a particular compound are partly separated by only a relatively thin film of the resin. In this situation, the polymer resin matrix volume is at a minimum and acts as individual segments or pockets to support a tensile load. When a tensile load is applied to the resin, these matrix segments stretch and pull away from the particles, resulting in a lower strength and lower elongation of a highly filled compound. As a result, to achieve reduced break load and reduced elongation, the amount of filler compounded into a resin should generally approach the $P_f$ of a particular filler. By one approach, the $P_f$ of the filler used in the modified bi-component binding fiber will generally range from about 0.32 to about 0.83; meaning the added filler in the polymer resin ranges from about 32 to about 83 percent by volume. Most preferably, the filler usage will be about 30 to about 70 percent by weight. It will be appreciated, however, the amount and size of filler can vary depending on the desired fiber strength, fiber characteristics, particular application, and other factors.

A preferred non-woven material comprises a core or base mat of about 30 to about 95 weight percent rock or slag wool and about 0.1 to about 70 weight percent of the modified bi-component thermal bonding fibers. In one form, the formed base mat is a self-supporting, relatively rigid, and substantially flat panel, such as a 2'×4' or a 2'×2' panel with a thickness preferably from about 0.25 to about 1.5 inches. In such form, the base mat is suitable for installation in a typical suspended ceiling grid or similar structure.

Due to the preferred inorganic base fibers in the core (i.e., mineral wools, rock wool, and/or slag wool), which have short lengths ranging from about 0.1 to about 4 mm, the formed non-woven core preferably has a relatively high basis weight in order to achieve the rigidity needed to produce a self-supporting core suitable for use as a ceiling tile. For example, it is preferred that the non-woven material has a basis weight of at least 3,000 grams/m² (gsm) and, most preferably, about 3,000 to about 5,000 gsm. The non-woven mats also preferably have a density from about 0.1 to about 0.5 g/cm³. As discussed above, even with the high basis weights and densities, the formed ceiling tiles are still capable of being manually cut with only minimal pressure using a utility knife generally due to the incorporation of the modified bi-component thermal bonding fibers. These non-woven mats also preferably exhibit noise reduction coefficients of about 0.3 to 1.0 and, most preferably, 0.55 to 1.0. Preferred non-woven materials also exhibit a modulus of rupture (MOR) or bending of a minimum 10 pounds per square inch (psi) and have a breaking load of a minimum of about 0.5 pounds (ASTM C 367-99). It will be appreciated, however, the above characteristics can vary depending on the formulation and process as needed for a particular application.

Optionally, the non-woven material also may include other components in the core as needed for a particular application. It is understood that any of a number of additional components known in the art that can be used with ceiling tile to achieve a particular purpose can be added. For example, the material may include up to about 70 weight percent granulates, such as expanded perlite, foamed glass, and the like. Functional chemicals, such as zeolite, active carbon and the like, also may be added to the base mat to generally provide air cleaning capabilities. In addition to the inorganic base fibers and bi-component thermal binding fibers, the core also may include other optional fibers, such as natural fibers (flax, bamboo, cellulose, sisal, and the like), glass fibers, other inorganic fibers, other organic fibers and mixtures thereof as needed. If desired, the non-woven material also may include a liquid or latex binder applied to one or more surfaces of or impregnated into the formed base mat to provide additional rigidity. For example, up to about 30 weight percent of a latex binder may be applied to one or both surfaces of the base mat.

In addition, the formed core may comprise one or more layers of the non-woven materials. If multi-layered, each layer may have similar or distinct properties as the other layers, such as similar or distinct basis weights, densities, and compositions as needed for a particular application. Multiple layers may be formed from laminating multiple base mats together or may be formed in-line using a multi-head forming machine.

The non-woven material also may be faced with a scrim or facer material on one or both sides of the core. As further discussed below, the facer may provide a decorative finish to the core or have properties that are effective to permit the non-woven material using the preferred inorganic base fiber (i.e., relatively short, abrasive, and high shot content fibers) and organic binding fiber to be manufactured using an air-laid process.

Figure 2:
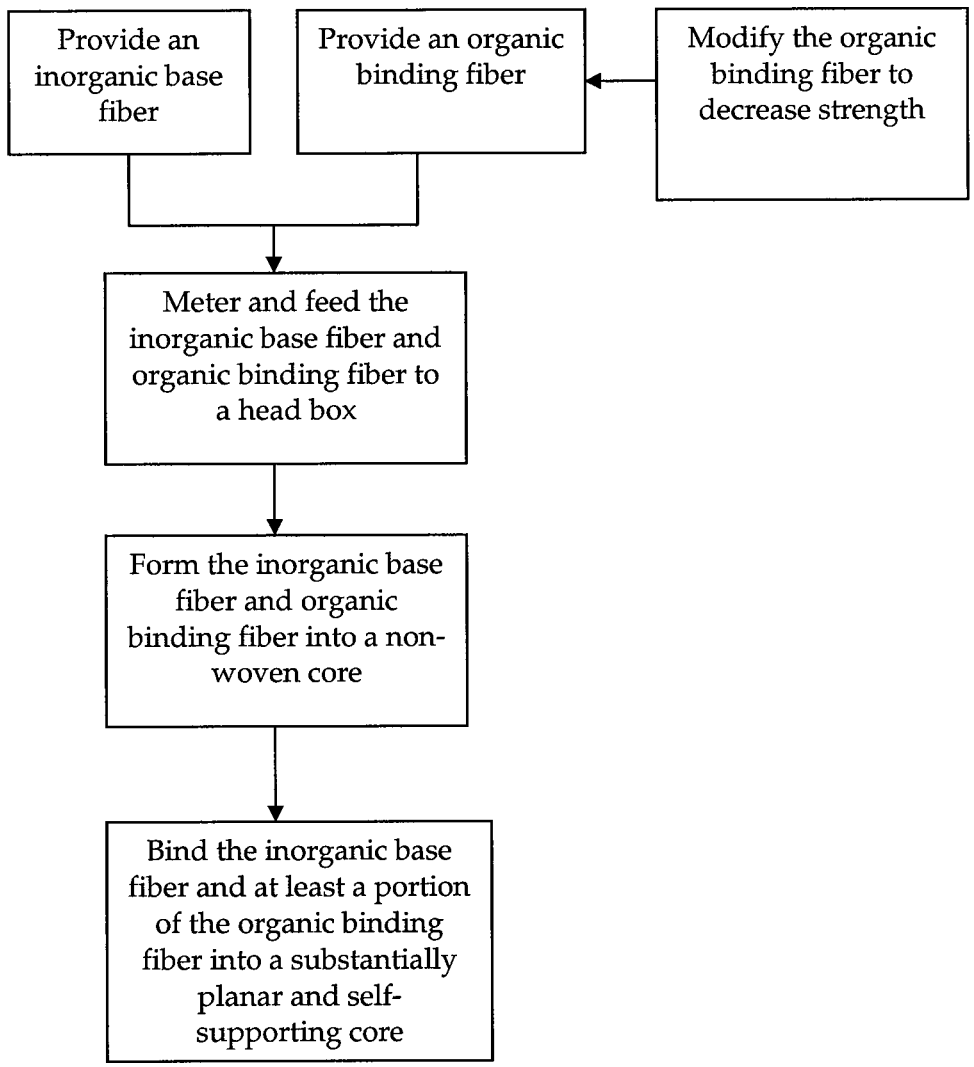
FIG. 2 is a flow chart of an exemplary non-woven forming process.

Turning to the details of forming the non-woven material, a method will be described with reference to FIGS. 1 and 2, which illustrates an exemplary air-laid manufacturing process 10 suitable to form the non-woven materials described above into a core having a sufficient basis weight and density to provide the rigidity needed so that the non-woven material can be used as an acoustic ceiling tile. For purposes herein, "air-laid" refers to any method or manufacturing process in which the individual ingredients are suspended in an air or other gaseous stream and that preferably forms a web, base mat, or batt on a porous wire web or other porous carrier surface. In general and with reference to FIG. 1, an air-laid process 10 suitable for forming acoustic ceiling tile structures includes the process steps: (a) raw material dispersing and blending 12, (b) metering and feeding the raw materials to a head box 14, (c) air-laid web forming 16, (d) optional compacting 18, (e) heating and cooling 20, (f) optional calendaring 22, (g) optional laminating 24, and (h) finishing 26.

As discussed above, the raw materials to form the non-woven base mat may include various inorganic or organic fibers, synthetic or natural fibers, powders, resins, granulates, and other components. Examples of suitable raw materials include, but are not limited to, mineral wool, rock wool, slag wool, fiber glass, bi-component fibers, cellulosic fibers, foamed glass beads, etc. Preferred raw materials include rock or slag wool and bi-component fibers. As discussed above, particularly preferred raw materials include about 30 to about 90 percent rock wool or slag wool and about 0.1 to about 70 percent organic binding fibers, such as the modified bi-component as discussed above.

In some cases, many of the fibrous raw materials generally need to be prepared into a form that is suitable for the air-laid forming processes. Accordingly, the process 10 first includes the dispersing and blending step 12. For example, fibers in the form of sheets, boards, and dry lap are often bonded to each other and need to be defibered before delivered to an air-laid former. Typically, these raw materials can be defibered with Hammer Mill-type equipment, which includes a rotor with swinging hammers to defiberize the feeding sheets. Likewise, raw materials in the form of bales such as mineral wool or synthetic fibers, can be pre-opened through a bale opener and then transported to a metering tower 30 through ventilators. Blending 32 of different fiber streams can be accomplished by injecting one stream into the other at pre-determined weight ratios to form a pre-dispersed fibrous raw material stream 34.

The pre-dispersed fibrous raw material stream 34 is then transported via an air stream to one or more fiber towers 36 that includes a lattice belt (not shown) where an initial non-woven fibrous mat is formed. The metering of the fiber is preferably accomplished through a weighing belt that is speed controlled. Metering ensures a steady and consistent supply of raw material to an air-laid machine. Metering in such a manner can also be useful to control the basis weight of formed base mat. After metering, fibrous raw materials are fed to one or more respective air-laid forming heads 38 through a transporting fan. A flow splitter may be used to balance the flow into each side of the forming head 38. While FIG. 1 illustrates three separate forming heads 38, the process 10 can include any number of forming heads as needed to form the desired thickness, density, and basis weights of the non-woven structure. Preferably, the formation of the non-woven web or batt is carried out in an air-laid forming head. Suitable air-laid forming heads can be obtained by Dan-Web (Denmark), M&J Fiber (Denmark), or FormFiber (Denmark); however, other air-laid suppliers are also suitable.

In one aspect of the air-laid machine 10, it is preferred that inner surfaces in direct contact with the raw materials be made of materials exhibiting a sufficient strength/hardness or have an application thereon that increases the strength of the materials or provides a replaceable/hardened surface. For example, at least portions of inner surfaces of pipes, blowers, forming heads, etc. of the air-laid machine 10 could be made from materials having a Brinell hardness of at least 250 units (ASTM E10). In another example, it may be desired to apply a layer of chromium carbide or similar material onto the inner surfaces of the machine 10 to protect the underlying materials. This coating may be helpful in machine sections where significant turbulence occurs. In yet another example, in machine locations including turns of 45° or larger, a long radius elbow could be installed and/or the elbow could be equipped with a replaceable wear component, such as an insert made of chromium carbide or similar material. Such machine details are only examples of but a few approaches to provide an air-laid machine suitable for processing the fibers of the present methods; there are, of course, other possible approaches that would be apparent to one skilled in the art after reading this disclosure.

In the air-laid machine 10, the fibrous ingredients are fluidized in an air or other gaseous stream to be deposited on a carrier surface 40, such as a porous wire web, scrim, or other porous material to form a web or batt of the non-woven material. Various devices are used to suspend the fibers or other ingredients in the air. In one example, as illustrated in FIG. 1, the forming head 38 may include two rotating drums 42 positioned horizontally in the cross machine direction and above the carrier surface 40. In this example, the drums 42 could have slots or holes to allow dispersed fibers to travel through each drum 42. In some cases, a revolving flow pattern may be formed as fibers move around the two drums. To fluidize the fibers, the drums also may include a needle roll located inside each drum. As the fibers enter the drum through the slots, the needle roll agitates and sifts the fibers. The air turbulence and slinging effect further disperse the fibers. In another example, the fibers can be blown into a drum-less former where a row of needle rolls dispatch the fibers down to the forming fabric. Other types of forming heads also may be suitable. In one example, a suitable air-laid drum is described in U.S. Pat. No. 4,640,810, which is incorporated herein by reference.

The fibrous raw materials are preferably fed to one or more of the forming heads 38 at both ends. If used, powder or granulate components can be fed in different locations. For a homogeneous blend of fiber and powder, a powder dispensing unit 44 may be installed above each of the forming heads 38 (this particular version not shown in the figures) where powder and fibers can be mixed to create the homogeneous mixture. For a powdered layer applied to the non-woven structure after web formation, as illustrated in FIG. 1, the powder dispensing unit 44 can be installed between or after one or more of the forming heads 38 to create one or more separate powder layers on a surface of the non-woven material.

Adjacent the forming heads 38, one or more vacuum suction boxes 46 are preferably mounted under the carrier surface 40. The suction created by the vacuum directs the air and fibers in the forming heads 38 to be deposited toward the carrier surface 40. Preferably, the vacuum boxes 46 are designed to maintain a constant air velocity through the forming heads 38 and over the entire opening of the vacuum box so that a uniform mat can be formed.

Because of the relatively fine and short inorganic base fibers preferred in the non-woven material described above (i.e., high shot contents and fiber lengths down to about 0.1 mm), the porosity of the traditional porous carrier surface 40 is generally insufficient to permit a non-woven material having basis weights of 3,000 gsm or greater to be formed using mineral wool, rock wool, and/or slag wool and traditional air-laid forming heads. For example, while the porous carrier surface 40 allows air to flow through but retains fibers and other ingredients, the typical carrier surfaces 40 employed with commercial air-laid machines can not prevent portions of the ingredients used herein from passing through. For example, the mineral wool, rock wool, and slag wool often come in fiber lengths down to about 0.1 mm and include up to about 60 percent shot content. In some cases, these fine materials could pass through the porous carrier surface 40 and become plugged in the air filtering system.

Accordingly, by one approach, the process 10 also includes the use of a porous liner or facer material 50 disposed on the porous carrier surface 40 to retain ingredients and prevent plugging of the air filtering system. To this end, the porous liner 50 preferably has a porosity less than that of the porous carrier surface 40, but still sufficient to permit the non-woven mat to be formed at the desired densities and basis weights. Preferably, the porous liner 50 is a tissue sheet, a glass mat, a scrim, or the like. If desired, the non-woven material may be bonded to the porous liner 50 via an adhesive or by bonding of the organic bonding fiber to the porous liner 50 when heated. In this case, the porous liner 50 also may comprise a decorative outer layer of the formed ceiling tile. As shown in FIG. 1, the porous liner 50 is unwound from a feed roll 52 prior to the air-laid forming heads 38; however, the liner 50 may be supplied to the forming heads in any known manner.

Preferably, the liner 50 is an acoustically transparent facer material and has properties to permit the inorganic base fiber and modified bi-component thermal bonding fiber to be formed into the base mat using the air laid heads 38 and vacuum boxes 46 at basis weights of at least about 3,000 gsm. As discussed above, the liner 50 may be secured to the formed core to achieve a desired aesthetic appeal on the outer surface thereof. In addition, the liner 50 also may add additional structural integrity to the formed panel.

Suitable liners 50 have a sufficient porosity effective to permit the desired basis weights to be uniformly formed in an air-laid head, but also restrict the relatively small size fibers and shot from passing through. By one approach, suitable materials used to make the liner 50 are fiber glass or other non-woven fabrics made of synthetic fibers or a mixture of inorganic and organic fibers. In one aspect, the basis weight of the liner 50 is preferably between about 50 to about 200 gsm (if the liner is made of fiber glass and binder) and, preferably, about 50 to about 125 gsm. In another aspect, the liner 50 preferably has a minimum tensile strength of about 10 psi (TAPPI T220) and about 500 Gurley stiffness units (TAPPI T543). In yet other aspects, the maximum specific air flow resistance is generally about 2000 Pa-s/m (ASTM C522); however, preferred liners have air flow resistance of about 50 Pa-s/m or less. Table 2 below identifies examples of fiber glass liners suitable in making acoustic ceiling tiles using the methods herein.

TABLE 2

Exemplary Air-Laid Liners

| Exemplary Liner | Basis Weight (gsm) | Caliper (in) | Tensile Strength (PSI) | | Stiffness (Gurley units) | | Specific Air Flow Resistance (Pa-s/m) |
|---|---|---|---|---|---|---|---|
| | | | CD | MD | CD | MD | |
| A | 123 | 0.020 | 42.1 | 45.7 | 2600 | 2793 | 41 |
| B | 80 | 0.024 | 31.9 | 53.6 | 2282 | 4919 | 16 |
| C | 79 | 0.015 | 32.2 | 40.7 | 1474 | 1815 | 45 |
| D | 107 | 0.022 | 35.6 | 44.4 | 3023 | 3067 | 48 |
| E | 116 | 0.028 | 39.1 | 48.1 | 3986 | 4552 | 36 |
| F | 98 | 0.024 | 33.3 | 52.6 | 2289 | 3778 | — |

After formation of the non-woven core, the unbonded web or batt may be compacted through nip rolls 60 to improve its structure or strength. The pressure and temperature of the nip rolls are generally adjustable to enable different levels of compacting. In addition, the nip rolls 60 are generally also equipped with adjustable gaps to control the thickness of the web or batt. The nip rolls 60 help to maintain the physical integrity of the mat before bonding and can reduce the roughness of the mat surface. By one approach, the nip rolls 60 will use low pressures.

As discussed above, the binding of the ingredients in the non-woven core is preferably achieved via the use of the modified bi-component thermal bonding fibers. However, other binding approaches also may be used instead of or in combination with the modified bi-component fibers for a particular application. For example, another method to fuse the non-woven materials is to apply thermosetting resin such as phenol-formaldehyde or urea-formaldehyde resin, to the fibers prior to blending 32 the fibers with mineral wool. Upon heating to a predetermined resin setting temperature, bonding is created due to polymerization of the resin monomers. In yet another approach, a spray 62 also may be used to impart latex binder to the web surface or to impregnate the web in a latex pool. In addition, the web may be re-moisturized followed by densifying through calendar or nip rolls. The use of latex may also help bind the liner 50 to the core.

Once the non-woven material is formed in the core and the optional binder materials are applied to the web, it is ready for heating and curing 20. By one approach, a thermal oven or dryer 64 is used to heat the web to at least the melting point of the binding component in the organic binding fiber in order to fuse the fibers into a fibrous matrix. Any moisture remaining in the web, if any, also may be evaporated during this heating step. While any known oven or dryer may be employed, it is preferred that the heat transfer in the oven be either conductive or convective, and a through-air flow oven is most preferred because it will generally accelerate the heating and, therefore, require a smaller oven.

Once out of the oven 64, the heated web is preferably cooled down by exposing it to a cold air stream blown by a fan 66. Alternatively, the formed non-woven article is cooled by passing through a cold air suction box, which may compact the non-woven mat and increase its density. If desired, the cold air suction box can be used to control the density of the article.

Optionally, the web also may be laminated 24 using a standard laminator 70 in order to provide an additional facer material to the opposite side of the web from the porous liner 50. The laminated web may then be further finished 26 by cutting to a desired size, trimming to the final product, and/or coating to produce acoustic ceiling tiles of proper sizes, edge details, surface textures, colors, and the like.

Accordingly, the non-woven material described above can preferably be fabricated via an air-laid process and still comprise the inorganic fibers (i.e., mineral wool) and modified bi-component binding fibers. Such process and formulation enables these components to be formed into a core structure suitable for use as an acoustic ceiling tile that meets acoustic and physical requirements and provides advantages over conventional wet-laid acoustic ceiling tiles. Because the air-laid formation process is substantially water-free, there is minimal and, preferably, no surface tension applied to the fibers resulting in a more lofty or bulky structure having better acoustical properties. The use of the preferred and modified bi-component fibers (synthetic fiber) imparts to the formed mat structural integrity, flexural strength, and cutability while maintaining the bulk of the mat. The uniqueness of the preferred and modified binding fiber is that it provides enhanced strength with reduced resin content (i.e., increased filler content), and provides the desired strength while maintaining the cutability of the mat, which is a characteristic important to installers. Preferred and modified bi-component fibers also have the advantage of better surface burning performance (i.e., lower smoke generation and slower flame spread) because of the relatively high filler content that is preferably an inorganic filler. In addition, the low melting points of the binding component can be customized as needed to bond various materials at various bonding temperatures.

Advantages and embodiments of the non-woven materials described herein are further illustrated by the following examples; however, the particular materials and amounts thereof recited in these examples, as well as other conditions and details, should not be construed to unduly limit the claims. All percentages are by weight unless otherwise indicated.

EXAMPLES

Example 1

A non-woven material was prepared with commercially available bi-component fibers and mineral wool. PE/PET bi-component thermal bonding fibers (T-255, Invista, Wichita, Kans.) having a 2.2 Denier and 6 mm length were pre-opened and blended with pre-opened mineral wool. The Invista PE/PET fiber has a core melting point of 250° C. and a sheath melting point of 135° C. The fibrous raw material contained about 90 percent mineral wool and about 10 percent bi-component fibers.

The fibrous mixture blend was metered in a Laroche metering tower (Laroche, SA) and fed to the forming drum of an air-laid forming machine (Dan-Web, Denmark). In the forming drum, the bi-component fibers and mineral wool were dispersed and suspended in the air by the rotating needles and the shear action created by two rotating drums. A forming wire equipped with a vacuum box was placed under the forming drums. A web or batt was formed on the forming wire as the vacuum directed the fibers to deposit on the moving wire. It was discovered that the forming wire was too porous to retain the shot content in the mineral wool. As a result, a tissue liner was used to retain the fibrous material on the forming wire.

After formation, the batt was heated to 135° C. to melt the sheath component. Upon cooling, the base mat became rigid. The formed base mat had margin cutability (required excessive force and exhibited fiber pull-out during cutting). The base mat exhibited little dimensional change after placed in a 90° F. and 90 percent RH room for one week. Tables 3 and 4 below list the physical and acoustic properties of the formed base mats. The formed mats did not have liners or scrims thereon.

TABLE 3

| | | | | Formulations | | | | | |
|---|---|---|---|---|---|---|---|---|---|
| Sample | Binder, % | Wool Content, % | Thickness, in | Density, lbs/ft$^3$ | Basis Wt., lbs/ft$^2$ | Basis Wt., gsm | MOR, psi, | Max Break Load, lbf | ENRC |
| A | 10% BiCo | 86 | 0.54 | 13.0 | 0.58 | 2848 | 23.1 | 1.6 | 0.58 |

TABLE 3-continued

| | | | | | Basis | Basis | | Max Break | |
| | | Wool | Thickness, | Density, | Wt., | Wt., | MOR, | Load, | |
| Sample | Binder, % | Content, % | in | lbs/ft³ | lbs/ft² | gsm | psi | lbf | ENRC |
|---|---|---|---|---|---|---|---|---|---|
| B | 10% BiCo | 86 | 1.0 | 10.0 | 0.83 | 4071 | 26.0 | 6.5 | 0.75 |

TABLE 4

Observations

| Sample | Observations |
|---|---|
| A | Marginal Cutability. Panel exhibited significant sag in middle indicating that it was not sufficiently rigid for a ceiling tile. |
| B | Marginal Cutability. Panel was self-supporting, rigid, and essentially sag free. |

Example 2

Bi-component fibers of various Denier and length were used as thermal bonding fibers to form base mats of acoustic ceiling tiles in an air-laid machine (Spike System, Form-Fiber, Denmark). The forming chamber consists of two rolls of spikes positioned vertically. The base mats contain various percentages of mineral wool, shredded newsprint, sisal fibers, and PE/PP bi-component fibers (Chisso Corporation, Japan) as provided in Table 5. The core (PP) had a melting point of 162° C. and the sheath (PE) had a melting point of 110° C. The samples were tested for acoustic properties and results are listed in Tables 5 and 6 below. The formed mats did not have liners or scrims thereon.

TABLE 5

Formulations

| Sample | Mineral Wool, % | BiCo Fiber (Denier/Length) | BiCo, % | Newsprint, % | Sisal Fiber, % | Thickness, in. | Density, lbs/ft³ | Basis Weight, gsm | ENRC |
|---|---|---|---|---|---|---|---|---|---|
| C | 75 | 72/16 | 25 | 0 | 0 | 1.21 | 6.9 | 3395.7 | 0.87 |
| D | 40 | 2.2/6 | 20 | 40 | 0 | 1.25 | 4.1 | 2084.4 | 0.92 |
| E | 50 | 2.2/6 | 20 | 0 | 30 | 1.06 | 4.8 | 2069.4 | 0.7 |
| F | 60 | 2.2/6 | 10 | 10 | 10 | 0.82 | 5.5 | 1834.3 | 0.74 |
| G | 60 | 2.2/6 | 10 | 10 | 10 | 1.22 | 5.5 | 2729.1 | 0.91 |

TABLE 6

Observations

| Sample | Observations |
|---|---|
| C | Difficult to cut due to the Denier of bi-component fibers. Panel was self-supporting, rigid, and essentially sag free. |
| D | Marginal Cutability. Panel exhibited significant sag in middle indicating that it was not sufficiently rigid for a ceiling tile. |
| E | Marginal Cutability. Panel exhibited significant sag in middle indicating that it was not sufficiently rigid for a ceiling tile. |
| F | Marginal Cutability. Panel exhibited significant sag in middle indicating that it was not sufficiently rigid for a ceiling tile. |
| G | Marginal Cutability. Panel exhibited significant sag in middle indicating that it was not sufficiently rigid for a ceiling tile. |

TABLE 6-continued

Observations

| Sample | Observations |
|---|---|
| | Panel exhibited significant sag in middle indicating that it was not sufficiently rigid for a ceiling tile. |

Example 3

A ceiling panel was formed in an air laid machine using mineral wool and about 10 percent commercially available PE/PET bi-component fibers with a 1.1 Denier and 6 mm length as the binder fiber (Hoechst-Trevira Type-255 (Charlotte, N.C.)). The mineral wool and binding fiber were blended together, and then fed to one or two Laroche metering towers. The raw material was metered by first conveying it to a fiber cell, then dropping onto a moving belt. The feeding speed was controlled by changing the belt speed. A transporting fan was used to feed the raw material to the air-laid forming head(s).

Base mats were formed on a cellulosic tissue layer or on a fiber glass scrim (A125EX-CH02, Owens Corning) unwinded from a butt roll. The fiber glass scrim was used to retain and carry fibers without affecting the vacuum drawn down. It also served as the face layer of the panel.

After the base mat was formed, another tissue layer, fiberglass scrim (Dura-Glass 5017, Johns Manville), or coating spray was optionally laid on top of the base mat before entering the heating oven. The oven temperature was about 329° F. The line speed was 28 inches per min. Exiting the heating oven, the formed panels were cooled down at the room temperature.

The formed panel exhibited the properties as listed in Table 7 below. All samples exhibited a marginal cutability with fibers pulled out of the edge surfaces and required relatively strong force to finish the cutting. Sample H exhibited significant sag indicating it was not suitable for a ceiling tile. With the face liner, Sample I exhibited a much improved sag despite low basis weight. Sample J was self-supporting and rigid. Sample K had both sides laminated with liners and was essentially sag free.

TABLE 7

Sample Properties

| Sample | Face Liner | Back Liner | Caliper, inch | Density, lbs/ft$^3$ | Basis Weight, g/m$^2$ | MOE, psi | Ave sag by sag bar test, inch | ENRC |
|---|---|---|---|---|---|---|---|---|
| H | Tissue | None | 0.85 | 6.18 | 2142 | 148.4 | 0.73 | 0.77 |
| I | A125EX-CH02 | None | 0.96 | 6.89 | 2699 | 194.6 | 0.10 | 0.82 |
| J | A125EX-CH02 | Tissue | 0.87 | 9.38 | 3335 | 364.0 | 0.16 | 0.78 |
| K | A125EX-CH02 | 5017 | 1.01 | 8.60 | 3538 | 200.6 | 0.01 | 0.85 |

Example 4

A base mat containing about 17.5% bi-component fiber (T 255, 1.1 Denier, 6 mm) was formed as in Example 3. The base mat was formed on a fiber glass scrim (A125EX-CH02, Owens Corning). The formed base mat was then sprayed with a liquid adhesive (HB Fuller glue) at about 3.4 g/ft$^2$. After heating, it was laminated with another fiber glass scrim (A125EX-CH02). The edges of the laminated panel were cut and the faces as well as edges were coated at about 10 to about 12 g/ft$^2$ to finish the panel as ceiling tiles. The coating composition included ethylene vinyl chloride (EVCL) polymer (Air Products, Allentown, Pa.), titanium dioxide (Huntsman, Billingham, England), calcium carbonate (J.M. Huber, Atlanta, Ga.), and clay (J.M. Huber). The average thickness of the panel was about 0.76 inches and the density was about 9.44 lbs/ft$^3$, which provided a basis weight of about 2929 gsm. As tested according to ASTM C-423-07, the sound absorption coefficient of this ceiling tile was about 0.8. The sample exhibited marginal cutability due to the inclusion of bi-component fibers having high break load and elongation, but the sample was self supporting, rigid, and essentially sag free indicating that it would be suitable for an acoustic ceiling tile.

It will be understood that various changes in the details, materials, and arrangements of parts and components which have been herein described and illustrated in order to explain the nature of the non-woven material and method of making thereof may be made by those skilled in the art within the principle and scope as expressed in the appended claims.

What is claimed is:

1. A ceiling tile including a non-woven material comprising:
a substantially planar and self-supporting core including an inorganic base fiber and an organic binding fiber wherein:
the organic binding fiber being a bi-component thermal bonding fiber formed by an organic binding component and an organic structural component combined in unitary filaments;
the binding component having a melting point sufficiently less than the melting point of the structural component so that when the organic binding fiber is heated to approximately the melting point of the binding component, the inorganic base fiber and organic binding fiber are at least partially bound to each other whereby said core is sufficiently self-supporting for use as a ceiling tile; and
the structural component being a blend of a plastic resin and a filler that reduces the strength of the organic binding fiber so that the fiber strengths of the inorganic base fiber and organic binding fiber do not differ substantially whereby the core exhibits high flexural strength and can be cut manually such as with a common utility knife with light pressure or only minimal effort;
the organic binding fiber having a fiber strength with a break load of about 10 grams or less and an elongation of about 20 percent or less.

2. The non-woven material of claim 1, wherein the structural component comprises about 5 to about 50 weight percent of the filler.

3. The non-woven material of claim 1, wherein the filler is selected from the group consisting of calcium carbonate, clay, talc, silica, feldspar, nepheline, mica, wallastonite, perlite, glass, silicates, titanium dioxide, calcium sulfate, and mixtures thereof.

4. A ceiling tile composition comprising:
a substantially planar and self-supporting core including an inorganic base fiber and an organic multi-component thermal binding fiber wherein;
the multi-component thermal binding fiber comprises a low melting point organic fiber component and a high melting point organic fiber component in unitary fiber filaments,
the melting point of the low melting point fiber component being sufficiently less than the melting point of the high melting point fiber component so that upon heating at least a portion of the multi-component thermal binding fiber is bound by heat bonding to at least a portion of the inorganic base fiber to form the core;
the high melting point fiber component being a blend of a plastic resin and a filler that reduces the strength of the thermal binding fiber so that the fiber strength of the inorganic base fiber and the organic binding fiber do not differ substantially whereby the core exhibits high flexural strength and can be cut manually such as with a utility knife, with light pressure or only minimal effort.

5. The composition of claim 4, wherein the high melting point fiber component comprises about 5 to about 50 weight percent of the filler.

6. The composition of claim 5, wherein the filler is selected from the group consisting of calcium carbonate, clay, talc, silica, feldspar, nepheline, mica, wallastonite, perlite, glass, silicates, titanium dioxide, calcium sulfate, and mixtures thereof.

7. The non-woven material of claim 1, wherein said organic binding fiber has an elongation less than 10% at break, a strength of from about 1 gram to about 4 grams at break and a denier in the range of from about 0.7 to about 1.7.

8. The non-woven material of claim 1, wherein said organic binding fiber has a length of from about 1 mm to about 25 mm, a denier in the range of from about 0.7 to about 1.7 and an elongation at break of less than about 6%.

* * * * *